United States Patent
Nakatani

(10) Patent No.: US 6,297,456 B1
(45) Date of Patent: Oct. 2, 2001

(54) SUPPORT STRUCTURE FOR WIRE HARNESS CONNECTION SECTIONS

(75) Inventor: Eiji Nakatani, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 09/376,020

(22) Filed: Aug. 19, 1999

(30) Foreign Application Priority Data

Aug. 19, 1998 (JP) .................................................. 10-232835

(51) Int. Cl.⁷ ....................................................... H01B 7/00
(52) U.S. Cl. ......................................... 174/135; 174/65 G
(58) Field of Search ................................ 174/65 G, 135, 174/151, 152 G, 153 G

(56) References Cited

U.S. PATENT DOCUMENTS

| | | | | |
|---|---|---|---|---|
| 3,033,913 | * | 5/1962 | Dietze | 174/60 |
| 3,564,486 | * | 2/1971 | Price . | |
| 3,610,810 | * | 10/1971 | Fribley | 174/59 |
| 4,864,078 | * | 9/1989 | Bowman | 174/48 |
| 5,936,200 | * | 8/1999 | Park | 174/65 R |
| 5,939,673 | * | 8/1999 | Rentmore | 174/59 |
| 5,986,210 | * | 11/1999 | Kummle | 174/59 |
| 6,027,367 | * | 2/2000 | Woertz et al. | 174/59 |
| 6,172,300 | * | 1/2001 | Kawaguchi | 174/135 |

FOREIGN PATENT DOCUMENTS 922743   1/1997   (JP) ................................ H01R/4/22

* cited by examiner

*Primary Examiner*—Jeffrey Sterrett
(74) *Attorney, Agent, or Firm*—Bierman, Muserlian and Lucas

(57) ABSTRACT

A support structure for a wire harness having a connection section. The structure includes a hollow support member, open at, one end, on a wall of an electrical connection box. An insulative cap is provided which has an outer diameter greater than the inner diameter of the support member. The cap surrounds the connection section and is pressed into the support member. Its resilience distorts the cap and thereby creates internal friction to resist inadvertent withdrawal. In a preferred form of the Invention, the cap is provided with one or more alternating shelves and grooves which assist in distortion. A further support can be provided on the support member and a portion of the wires taped thereto. This provides a water and vibration resistant connection which is easy to assemble and minimizes the number of parts required.

7 Claims, 3 Drawing Sheets

SUPPORT STRUCTURE FOR WIRE HARNESS CONNECTION SECTIONS

This Application claims the priority of Japanese Application 10-232835, filed Aug. 19, 1998.

The present Invention relates to an improvement in electrical connection boxes used to hold various automotive electronic devices and which serves as a connection junction point for wire harnesses related thereto. More specifically, it is a structure for supporting the connection section of the harness in the connection box reliably and in a waterproof manner.

BACKGROUND OF THE INVENTION

In Japanese OPI 9-22743, a device of this general type is described. As shown in FIG. 6 hereof, covered cylindrical projection 103 is formed on wall 102 of connection box 101. One end of projection 103 is open to receive connection section 105 of wire harness trunk 104. To support connection section 105, support hook 106, through which wire harness trunk 104 passes, is provided.

However, since connection section 105 of wire harness trunk 104 is supported only by support hook 106, the support is not stable and can permit connection section 105 to slip out of projection 103. This tendency is enhanced by vibration and, since these devices are primarily intended for use in the engine compartment of an automobile, the risk is substantial. It is an object of the present Invention to provide a structure which will reliably retain the connection section of the wire harness in the connection box and also will assist in preventing the ingress of water.

SUMMARY OF THE INVENTION

The support structure in accordance with the present Invention comprises a hollow support member on a wall of the electrical connection box. The support member is open at one end and an insulative cap, adapted to surround and grip the connection section of the wire harness is inserted therein. The cap preferably has an outer diameter which is somewhat greater than the inner diameter of the support member. As a result, the insulative cap, which is made of elastic or resilient material, can be pressed into the support member against the frictional resistance it provides. Once in, it is secure and retains the connection section within the support member.

In the preferred form of the device, the support member is cylindrical and the insulative cap is provided with a plurality of alternating shelves and grooves. The outer diameter of the shelves is slightly greater than the inner diameter of the support member and the diameter of the grooves is substantially less than the inner diameter of the support grooves. The grooves provide added resilience to the insulative cap and permit substantial distortion of the shelves on insertion and increase the resistance to withdrawal.

The support structure of the present Invention comprises a support mounted on the wall of the connection box and fixing tape wrapped around the support and a portion of the wire harness. This assists in retaining the connection section within the support member and may be used with or without the alternating shelves and grooves.

A further feature of the present Invention is at least one projection on the open end of the support member which extends radially inwardly thereof to provide a ledge. Preferably, the ledge should be small enough so that the insulative cap can be pressed into the support member, but large enough so that, after the insulative cap is within the support member, it will rest on the ledge and be retained thereby. This can be used in conjunction with the tape and/or the shelves and ledges.

BRIEF DESCRIPTION OF THE DRAWINGS

In the accompanying drawings, constituting a part hereof, and in which like reference characters indicate like parts.

DETAILED DESCRIPTION OF THE INVENTION

Figure 1:
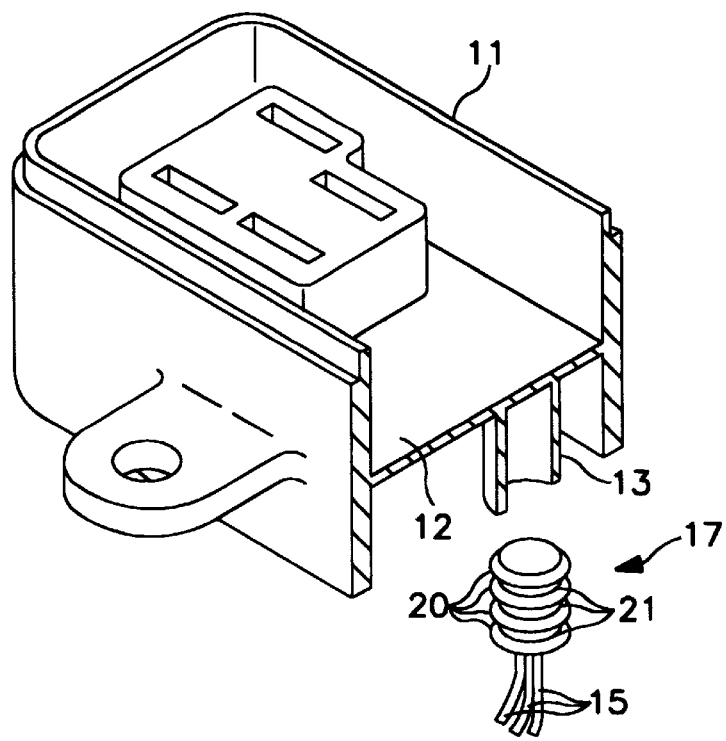
FIG. 1 is an exploded perspective view, partially cut away, showing the electrical connection box of the present Invention.
Figure 2:
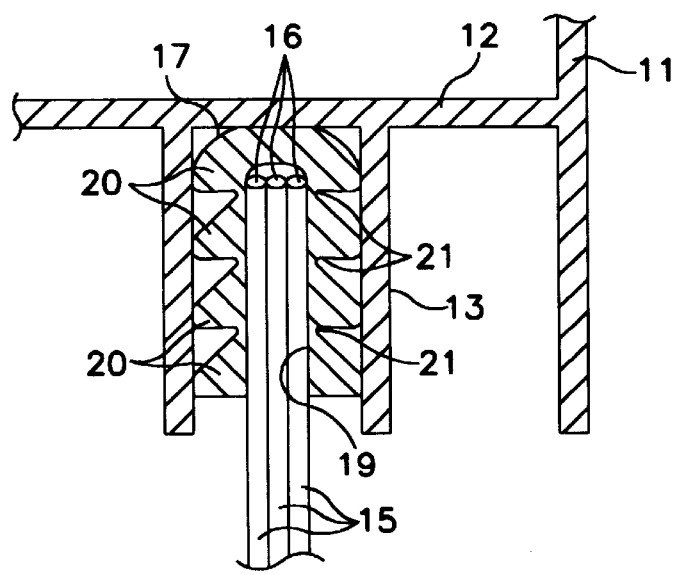
FIG. 2 is a fragmentary cross section of a portion of the, device of FIG. 1, with the insulative cap and connection section inserted in the insertion cylinder.

Referring first to FIGS. 1 and 2, insertion cylinder 13 projects from bottom wall 12 of electrical connection box 11. The cylinder is a covered support member extending downwardly from the bottom wall and is formed integrally therewith.

The ends of a plurality of trunk lines 15 of a wire harness are resistance welded to form connection section 16. The connection section is covered by insulative cap 17 of elastic material and includes holding section 19 for retaining connection section 16 within insertion cylinder 13.

A plurality of ring-shaped shelves 20, alternated with ring-shaped grooves 21, is formed on the outer surface of insulative cap 17. The outer diameter of shelves 20 is slightly larger than the inner diameter of insertion cylinder 13 and these shelves are sloped toward the open end of the insertion cylinder. This assists in permitting distortion of insulative cap 17 as it is introduced into insertion cylinder 13. As a result, it grips the inner surface of the insertion cylinder tightly and retains connection section 19 in place, yet is easy to insert.

Connection section 16 is inserted into cylinder 13 by pressing insulative cap 17 into the open end of cylinder 13. This creates elastic contact between shelves 20 and the inner surface of cylinder 13 and prevents section 16 from slipping out of the insertion cylinder, even when the device is subjected to vibration. Moreover, the contact between the shelves and the insertion cylinder also prevents the entry of water into the cylinder. Furthermore, since insulative cap 17 grips connection section 16, even if it should slip out of insertion cylinder 13, the cap will not come of f the connection section and expose it. Therefore, short circuits will be avoided even in this situation.

Grooves 21 permit deformation of shelves 20 so that, when insulative cap 17 is inserted into insertion cylinder 13, shelves 20 are deformed so that they are radially compressed into the space left by grooves 21. This lowers resistance to insertion and facilitates this operation. Moreover, if a withdrawing force is applied to trunk lines 15, shelves 20 will deform so that they are radially expanded, thereby increasing the resistance and aiding in the retention of the insulative cap within the insertion cylinder. It should also be noted that forming insertion cylinder 13 integrally with wall 12 reduces the number of parts and minimizes production costs.

Figure 3:
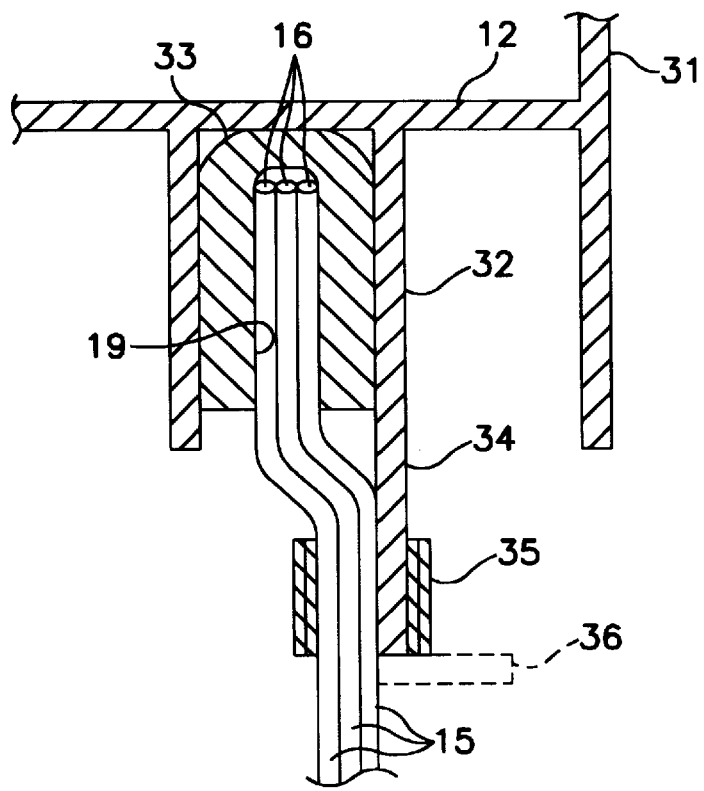
FIG. 3 is a view, similar to that of FIG. 2, of a modification of the present Invention.

As is best shown in FIG. 3, insertion cylinder 32 is provided with fixing projection 34. Trunk lines 15 are directed adjacent the fixing projection and are bound thereto by fixing tape 35. Insulative cap 33 has an outer diameter slightly larger than the inner diameter of insertion cylinder 32, but need not have the shelves and grooves as shown in FIG. 2. In a preferred form of the Invention, projection 36 is mounted on the end of fixing projection 34 and fixing tape 35 rests thereon. This is added protection against unwanted withdrawal of holding section 19 from insertion cylinder 32 mounted on connection box 31.

Figure 4:
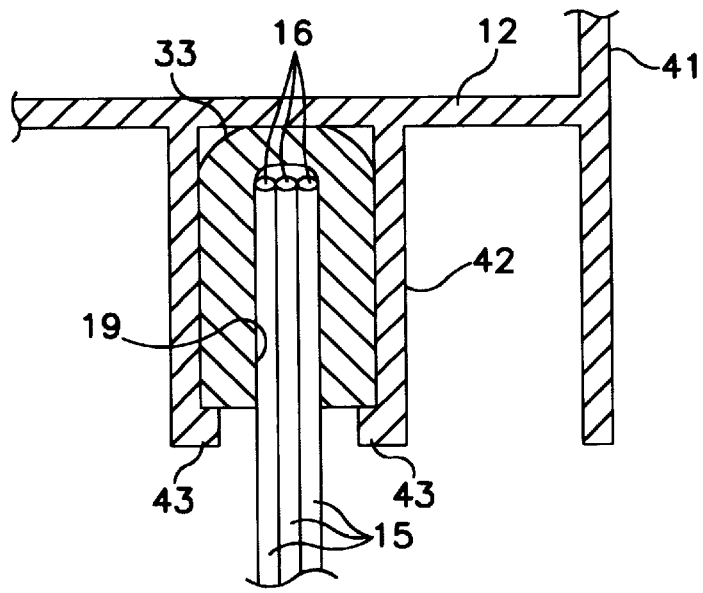
FIG. 4 is a view, similar to that of FIG. 3, showing a further modification of the present Invention.

Referring now to FIG. 4, insertion cylinder 42 is-provided with radially inwardly extending support projection 43. The ledge formed thereby is large enough to support insulative cap 33 and prevent it from being inadvertently withdrawn. At the same time, it is short enough so that insulative cap 33 can be pressed into insertion cylinder 42 which is mounted on bottom wall 12 of connection box 41.

Figure 5:
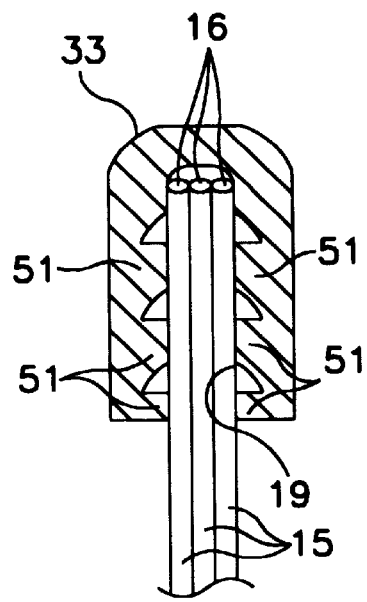
FIG. 5 is a sectional view of one form of insulative cap in accordance with the present Invention.
Figure 6:
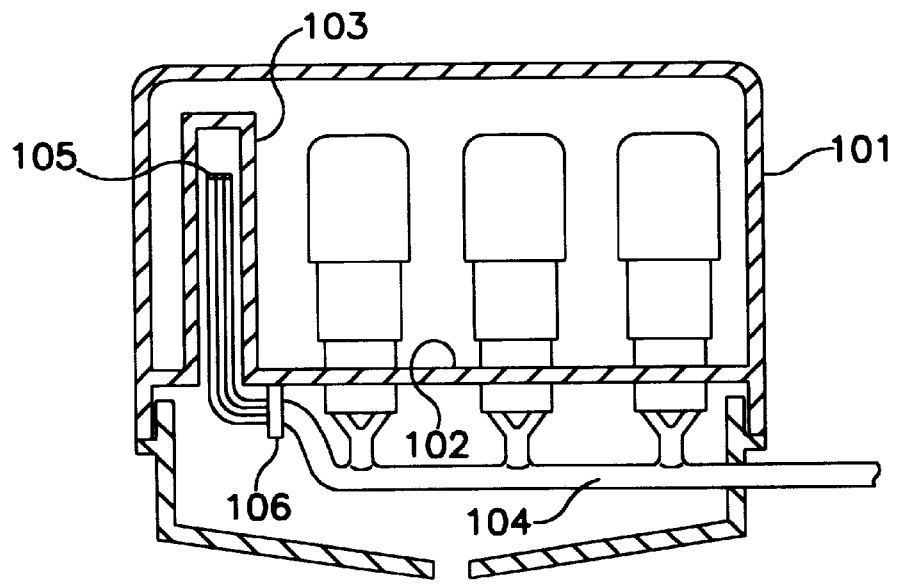
FIG. 6 is an elevation, partly in section, of a prior art device.

In FIG. 5, insulative cap 33 grips connection section 16 in the manner previously described. A plurality of shelves 51, separated by grooves, projects inwardly from the inner diameter of insulative cap 33. This provides additional protection against the entry of moisture, as well as additional resistance to removal of connection section 16 from the insulative cap. The other forms of insulative cap previously described can all be modified to include this additional feature.

Although only a limited number of specific embodiments of the present Invention have been expressly described, such variations as would be apparent to the person of ordinary skill may be made without departing from the scope or spirit thereof. For example, insertion cylinders 13, 32, and 42 could be of substantially any hollow shape with one end open. Moreover, they could project upwardly from bottom wall 12. Furthermore, the shape of insulative caps 17 and 33 can be varied, so long as it corresponds to the shape of insertion cylinders 13, 32, and 42.

The insertion cylinders could be formed separately from the bottom wall, although unitary construction is preferable because of simplicity. The material of which the insulative caps are formed could be any thermoplastic elastomer, such as silicone rubber or the like.

Although the present Invention has been described herein with respect to specific construction, it is, nonetheless, to be broadly construed and not to be limited except by the character of the claims appended hereto.

What we claim is:

1. A support structure for a wire harness having a connection section, said structure comprising a hollow support member on a wall of an electrical connection box and open at one end, an insulative cap, having at least one outer horizontal dimension greater than corresponding inner dimension of said support member, surrounding said connection section and within said support member, whereby said insulative cap is distorted by said support member and said connection section is retained in said support member.

2. The support structure of claim 1 wherein said support member is cylindrical.

3. The support structure of claim 1 wherein said insulative cap is provided with a plurality of alternating shelves and grooves, said shelves having said outer diameter and said grooves having a groove diameter less than said inner diameter.

4. The support structure of claim 1 comprising a support on said wall, fixing tape wrapped around said support and a portion of said wire harness, thereby to further retain said connection section in said support member.

5. The support structure of claim 4 wherein there is a projection adjacent said tape remote from said insulative cap, said tape resting on said projection.

6. The support structure of claim 1 wherein there is a projection on said one end of said support member extending radially inwardly to provide a ledge, said insulative cap resting on said ledge.

7. The support structure of claim 1 wherein said insulative cap is provided with alternating ridges and valleys extending inwardly from its inner surface and bearing against said connection section.

\* \* \* \* \*